United States Patent [19]

Wu

[11] 4,141,562
[45] Feb. 27, 1979

[54] METHOD OF ENHANCING THE PERFORMANCE OF LIP-TYPE SHAFT SEALS

[75] Inventor: David H. Wu, Warren, Mich.

[73] Assignee: Sperry Rand Corporation, Troy, Mich.

[21] Appl. No.: 538,671

[22] Filed: Feb. 3, 1975

Related U.S. Application Data

[60] Division of Ser. No. 442,725, Feb. 14, 1974, abandoned, which is a continuation-in-part of Ser. No. 313,712, Dec. 11, 1972, abandoned.

[51] Int. Cl.² ............................................. F16J 15/32
[52] U.S. Cl. ........................................ 277/1; 277/152; 277/164; 277/165
[58] Field of Search ................... 277/1, 152, 164, 153, 277/165

[56] References Cited

U.S. PATENT DOCUMENTS

| | | | |
|---|---|---|---|
| 1,969,797 | 8/1934 | Hubbard et al. | 277/183 |
| 2,316,941 | 4/1943 | Dodge | 277/49 |
| 2,816,784 | 12/1957 | Stucke | 277/152 |
| 2,992,027 | 7/1961 | Wright et al. | 277/153 X |
| 3,346,265 | 10/1967 | Rhoads et al. | 277/152 |
| 3,521,890 | 7/1970 | Holmes et al. | 277/165 X |
| 3,572,734 | 3/1971 | Holt | 277/165 |
| 3,685,127 | 8/1972 | Potter | 277/153 |

*Primary Examiner*—Richard E. Aegerter
*Assistant Examiner*—L. Footland
*Attorney, Agent, or Firm*—Schovee & Boston

[57] ABSTRACT

A lip-type cartridge shaft seal has its toroidal body cavity filled with a silicone rubber adhesive sealant bonded to the main body of the seal. The silicone's adhesive properties and its lower hardness stabilize the body against collapse under intermittent or continuous high pressure forces without interfering with body flexibility.

12 Claims, 2 Drawing Figures

METHOD OF ENHANCING THE PERFORMANCE OF LIP-TYPE SHAFT SEALS

This application is a division of abandoned application Ser. No. 442,725, filed Feb. 14, 1974, which is a continuation-in-part of abandoned application Ser. No. 313,712, filed Dec. 11, 1972, for Power Transmission.

Lip-type seals for rotary or reciprocating shafts in a common configuration utilize a body of synthetic rubber supporting the lip which contacts the shaft. The body shape provides a tubular or conical flexing section between the shaft engaging part and the housing engaging part, and this allows for a considerable degree of shaft-run-out. Usually a garter spring surrounds the lip supporting portion of the body. Such shaft seals are widely used with great success in most sealing applications where the fluid within the housing is not exposed to high pressures. In certain applications there do arise conditions which expose the seal occasionally to either a steady or an intermittent pulsing high pressure sufficient to collapse the flexible tubular portion supporting the lip. Under these conditions, the seal rapidly deteriorates. One example of this phenomenon occurs with axial piston hydraulic pumps wherein the housing contains hydraulic fluid which is normally at a nominal low pressure. However, upon overloading or overspeeding, lifting of the cylinder barrel can occur intermittently, permitting a high system operating pressure to reach the seal and collapse the lip.

Lip-type cartridge shaft seals are produced in great numbers and at low cost through quantity production methods, but due to their inability to withstand either intermittent or steady applications of high pressure, have been unsatisfactory for these applications which, up to now, have only been satisfactorily met by the use of much more expensive high pressure shaft seals.

Prior efforts to raise the pressure sealing capability of lip-type seals have included the addition of housing parts and of O-rings such as found in the patent to Dahlheimer U.S. Pat. No. 3,443,814. These have not, however, met the need for a low cost, high pressure lip-type seal. It has also been proposed to combine a hard, feather-edge type seal with an elastomeric filter to improve pressure performance, as seen for example, in Holt U.S. Pat. No. 3,572,734 (of record in the parent application to this one) and in Workman U.S. Pat. No. 3,447,731 but these improvements are not applicable to lip-type seals.

It is an object of the present invention to provide an improved lip-type shaft seal utilizing the inexpensive configuration commonly available for ordinary low pressure purposes and with only a minor cost increase to provide satisfactory resistance to the application of high pressure forces throughout a long seal life.

Another object of the invention is to provide an improved method for preventing deterioration of a lip-type seal installed in the space between a shaft and a housing bore through which the shaft extends, due to exposure to high internal fluid pressure in the housing.

A further object is to provide an improved method for sealing the space between a shaft and a bore of a housing through which the shaft extends while the housing is subjected to high internal fluid pressure.

These objects are accomplished by the provision of a shaft seal comprising a body having a shaft engaging lip and a flexible first body portion extending from the lip axially outwardly, the body having additional portions which with the first portion enclose a generally toroidal space, and a ring of elastomeric material contained in the toroidal space and bonded to the body at least along the axially innermost extending sides of the toroidal space. The body preferably includes an elastomeric member and the elastomeric ring is preferably an adhesive sealant having a hardness materially less than that of the elastomeric part of the body.

IN THE DRAWING

Figure 1:
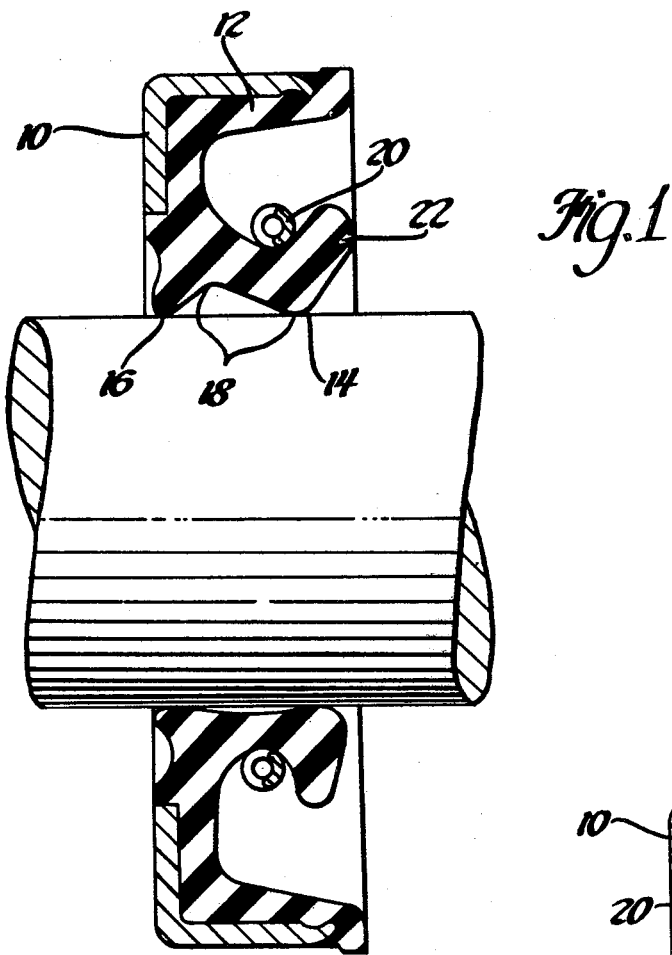
FIG. 1 is a cross sectional view of a shaft seal of conventional form showing its configuration under both low pressure and high pressure forces.

Referring now to FIG. 1 which shows a conventional cartridge type lip seal, the cartridge or body is composed of a pressed steel annulus 10 to which is bonded an element 12 of an elastomer such as Neoprene or Buna-N. The element 12 has formed on it a shaft engaging lip 14 for sealing the escape of fluid along the shaft from the right-hand inner face to the left-hand outer face of the seal. Commonly, an auxiliary lip 16 is also provided to protect against the entrance of dirt from the outside. As shown in the upper half of FIG. 1, the element 12 is of generally C-shape in cross section and includes a flexible tubular or conical section 18 which joins the lip 14 to the stationary portions of the element which are bonded to the annulus 10. A garter spring 20 (or other type of spring) provides a constricting force substantially in line with the lip 14 and can be retained against displacement by the flange portion 22 or by being seated in an annular groove, not shown.

A seal of this type, when subjected to either a steady or an intermittent pulse of very high pressure fluid on its inner face, will collapse substantially into the configuration shown at the lower part of FIG. 1. This is caused by the pressure forces acting on the top surface of the section 18 which are unopposed by any significant forces on its under surface. (see the arrows in FIG. 1.) The forces acting on the flange section 22 are substantially balanced. Continued applications of such pressures cause rapid wear and erosion. Under intermittent applications of pressure, the garter spring may move along the inner surface of the element and result in heat and fatigue deterioration of the flexible portion 18 of the element itself. This produces early destruction of the seal in many cases and has been known to occur within a matter of an hour or two from the installation of a new seal.

According to the present invention, these difficulties are overcome by filling the generally toroidal cavity of the seal element with a ring of an elastomeric material bonded to the body of the seal which prevents collapse of the seal under high internal pressure. Such a ring is indicated at 24 in FIG. 2. One preferred material for this purpose is a silicone (or other) rubber adhesive sealant having the properties, before curing, of softness and spreadability to enable its ready application into the toroidal cavity and the ability to cure to a rubber-like consistency with a high degree of adhesion to the element 12. Among the silicone compounds available and suitable for such use in the General Electric Company's Silicone Rubber Adhesive Sealant RTV 108. Besides its adhesive properties when cured, it has a hardness of Shore A 30, a tensil strength of 350 P.S.I. and an elongation of 400%. Typical hardness of the element 12 may be Short A 70 or within a range of A 50 to A 85.

Other elastomeric materials having similar physical properties may be used including nitriles, polyacrylics, fluorelastomers, and urethanes.

The elastomeric ring 24 can either be bonded to the element 12 by the elastomer being an adhesive sealant or by using a separate bonding method or agent such as a suitable glue or cement. The element 12 is preferably an elastomer but other materials can be used as will be obvious to one skilled in the art, such as leather and polyetrafluoroethylene. When the element 12 is an elastomer, the ring 24 preferably has a hardness substantially less than that of the element 12, such that the ring will not interfere with the flexibility of the seal. In the preferred embodiment the seal body includes both a metal case 10 and the elastomeric element 12 bonded at least to the radially extending part of the metal case 10 and preferably to the entire metal case 10. The ring 24 preferably substantially fills the toroidal space or cavity, i.e., the axially inner face of the ring 24 is preferably located not further, in the axially outward direction, than the plane transverse to the shaft axis and passing through the sealing lip 14. The ring 24 must be bonded to the element 12 (or to both the element 12 and the metal case 10 in those embodiments wherein the element 12 only covers a portion of the inner surface of the metal case 10) to prevent fluid from flowing in between the ring and the element, and is preferably completely bonded to the element 12 at all contacting areas therebetween; however, the ring can be bonded along only the axially extending portions of the element 12 and in fact at a minimum can be bonded only to the axially innermost annular sections of areas 26 and 28 of the element 12 at both of the axially extending portions thereof. In the preferred embodiment shown, the seal is U-shaped; however, other shapes such as the well known V-shaped seals can also be used with the present invention. Thus, the seal body includes a first flexible portion extending axially outwardly from the sealing lip and a second portion that extends radially outwardly and axially inwardly. The second portion can be a single straight element as in a V-shaped seal or two straight elements (one radial and one axial) as in a U-shaped seal. The length of the section 18 in the present invention is preferably at least 0.05 inch and can be much longer to accommodate greater shaft run-out than is possible with prior art high pressure seals, which seals have a very short lip. The ring 24 is preferably formed "in situ" although this is not essential.

Figure 2:
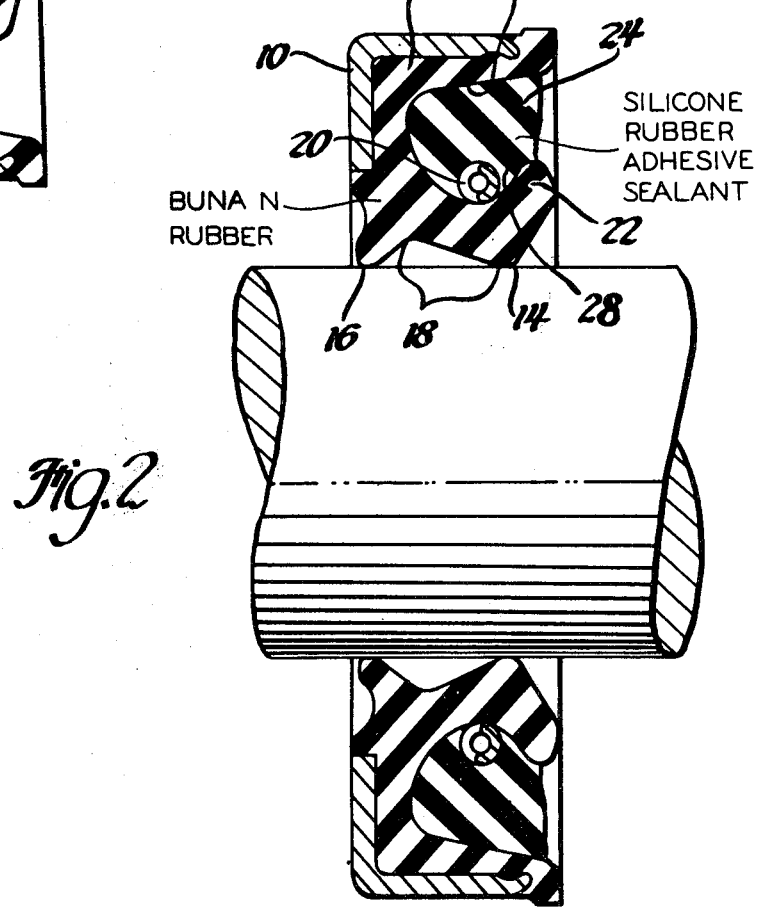
FIG. 2 is a cross sectional view of a shaft seal incorporating a preferred form of the present invention.

As indicated in FIG. 2, the pressure forces can act only on the right face of the ring 24 and of the flange 22. Due to the adhesion between ring 24 and the top and bottom sides of the toroidal cavity, collapse of the section 18 such as shown at the bottom of FIG. 1, is resisted up to pressures as much as 100 times that causing collapse in the comparable conventional seal.

Seals made in this manner have been found to function well in environments such as hydraulic pump housings where subjected to intermittent high pressure pulses and to have a service life comparable to that of a conventional seal in a strictly low pressure housing application. Such conventional seals, however, were unable to withstand the high pressure pulsing service without complete failure in a matter of a very few hours.

I claim:

1. A method for sealing the space between a shaft and a bore of a housing through which the shaft extends, the housing being under high internal fluid pressure, the method comprising providing in the space between the shaft and bore, a lip-type seal body having an axially inwardly extending, shaft-engaging sealing lip, a first portion extending from the sealing lip axially outwardly, and a second portion extending thence radially outwardly and axially inwardly providing a generally toroidal space facing inwardly toward the internal fluid pressure, said first portion having a radially inner surface the diameter of which is greater than the inner diameter of said lip such that said inner surface is spaced from and out of contact with said shaft and preventing deterioration of said first portion by its being forced radially inwardly down upon said shaft by the fluid pressure, by substantially filling said toroidal space with a ring of elastomeric material in contact with said fluid pressure, and bonding said ring to the entire surface of said body in contact with said ring, said filling and bonding steps including the steps of holding said first portion up off of said shaft, preventing said fluid from getting between said ring and said first portion, and allowing said first portion to retain its flexibility without any substantial interference from said ring.

2. The method according to claim 1 wherein at least said first portion of said body is composed of an elastomeric material and in which said filling step comprises substantially filling said toroidal space with an elastomeric adhesive sealant material.

3. The method according to claim 2 wherein said filling step includes filling said space with an elastomeric adhesive sealant material having a hardness substantially less than that of the elastomeric portion of said body.

4. The method according to claim 1 including the step of providing said sealing lip with a predetermined amount of elasticity by incorporating a spring therein.

5. The method according to claim 1 including the steps of positioning said lip type seal body on a shaft with said toroidal space facing inwardly toward said fluid pressure and sealing said high internal fluid pressure with said lip type seal body.

6. The method according to claim 1 wherein said substantially filling step comprises substantially filling said toroidal space while said seal is on said shaft with a ring of elastomeric material in a fluid state and simultaneously curing and bonding said ring to said body.

7. A method for sealing the space between a shaft and a bore of a housing through which the shaft extends, the housing being under high internal fluid pressure, the method comprising providing in the space between the shaft and bore, a lip-type seal body having an axially inwardly extending, shaft-engaging sealing lip, a first portion extending from the sealing lip axially outwardly, and a second portion extending thence radially outwardly and axially inwardly providing a generally toroidal space facing inwardly toward the internal fluid pressure, said first portion having a radially inner surface the diameter of which is greater than the inner diameter of said lip such that said inner surface is spaced from and out of contact with said shaft and preventing deterioration of said first portion by its being forced radially inwardly down upon said shaft by the fluid pressure, by substantially filling said toroidal space with a ring of elastomeric material in contact with said fluid pressure, and bonding said ring to the entire surface of said body in contact with said ring, said filling and bonding steps including the steps of holding said first portion up off of said shaft and preventing said fluid from getting between said ring and said first portion.

8. The new use of a filler of elastomeric material in a generally toroidal space of a lip type seal body installed between a shaft and a housing being under high fluid pressure, the seal body having a radially inwardly extending shaft engaging sealing lip, a flexible first portion extending from the sealing lip axially outwardly, and a second portion extending radially outwardly and axially inwardly to provide said generally toroidal space, said first portion having a radially inner surface the diameter of which is greater than the inner diameter of said lip such that said inner surface is spaced from and out of contact with said shaft, said new use comprising preventing deterioration of said first portion of said lip type seal body when installed between a shaft and a housing and exposed to high internal fluid pressure with said toroidal space facing said fluid pressure, by substantially filling said toroidal space with a ring of elastomeric material such that said material will be in contact with said high internal fluid pressure, and bonding said ring of material to the entire surface of said body in contact with said ring, said filling and bonding steps including the steps of holding said first portion up off of said shaft, preventing said fluid from getting between said ring and said first portion, and allowing said first portion to retain its flexibility without any substantial interference from said ring.

9. The new use according to claim 8 including the steps of positioning said lip type seal body on said shaft with said toroidal space facing inwardly toward said fluid pressure such that said high internal fluid pressure is in contact with said ring of elastomeric material and sealing said high internal fluid pressure with said lip type seal body.

10. A method for sealing the space between a shaft and a bore of a housing through which the shaft extends, the housing having high internal fluid pressure, the method comprising providing the space between the shaft and bore, a lip-type seal body having an axially inwardly extending, shaft-engaging sealing lip and also having a first portion spaced radially outwardly away from the shaft and extending from the sealing lip axially outwardly, having a second portion extending thence radially outwardly, and having a third portion extending thence axially inwardly to enclose on three sides a generally toroidal space facing inwardly toward the internal fluid pressure, and preventing deterioration of said lip type seal body due to exposure to said high internal fluid pressure tending to force said first portion radially inwardly into contact with the shaft by substantially filling said toroidal space with a ring of elastomeric material that can, when bonded to all axially extending portions of said seal body, hold said first portion radially outwardly away from and out of contact with a shaft in contact with said lip against the force of high internal fluid pressure in contact with said ring and tending to force said first portion radially inwardly into contact with the shaft, said ring of elastomeric material being located such that it is in contact with said fluid pressure, and bonding said ring to said body along at least all of said first and third portions of said body.

11. The method according to claim 10 wherein said step of substantially filling said toroidal space comprises substantially filling said toroidal space with a ring of elastomeric material impervious to said fluid.

12. The method according to claim 10 wherein said filling step comprises substantially filling said toroidal space with a ring of elastomeric material having a hardness in the range of about Short A30 to Shore A85.

* * * * *

UNITED STATES PATENT AND TRADEMARK OFFICE
CERTIFICATE OF CORRECTION

PATENT NO. : 4,141,562
DATED : Feb. 27, 1979
INVENTOR(S) : David H. Wu

It is certified that error appears in the above-identified patent and that said Letters Patent are hereby corrected as shown below:

In claim 12, line 4, delete "Short" and substitute therefore --Shore--,

Signed and Sealed this

Nineteenth Day of June 1979

[SEAL]

Attest:

RUTH C. MASON
Attesting Officer

DONALD W. BANNER
Commissioner of Patents and Trademarks